United States Patent Office 3,804,928
Patented Apr. 16, 1974

3,804,928
METHOD FOR PREPARING MASSIVE NITRIDES
Ji Young Chang, Murrysville, Pa., and William M. Ewing, Oak Ridge, William Fulkerson, Clinton, and David L. McElroy and Samuel C. Weaver, Knoxville, Tenn., assignors to the United States of America as represented by the United States Atomic Energy Commission
No Drawing. Filed Jan. 25, 1972, Ser. No. 220,686
Int. Cl. C09g 56/00
U.S. Cl. 264—0.5                                 2 Claims

ABSTRACT OF THE DISCLOSURE

Actinide nitride and other metal nitride structures of relatively large mass are prepared by confining a metal body in a nitrogen atmosphere and then subjecting the body to a moving-zone melting operation. The metal nitride resulting from the reaction between the molten metal and the nitrogen is of essentially stoichiometric composition and of essentially theoretical density.

---

The present invention relates generally to the preparation of metal nitrides, and more particularly to a method for preparing massive actinide nitride bodies of essentially theoretical density and stoichiometric composition. The present invention was made in the course of, or under, a contract with the U.S. Atomic Energy Commission.

Metal nitrides, particularly actinide nitrides, will apparently be useful in advanced nuclear reactor applications since as nitrides the actinides exhibit a greater thermal conductivity than the same actinides in oxide form. This results in lower temperature gradients so as to permit the use of higher reactor operating temperatures and significantly higher power levels. Also, other nitrided metals, such as aluminum nitride and boron nitride, possess relatively high electrical resistance and good thermal conductivity so as to render them particularly useful in many industrial appilcations such as heat sinks for dissipating waste heat and high-temperature electrical insulation in heaters.

In order to best utilize metal nitrides in applications such as described above, the nitrides are preferably in the form of pellets, or elongated structures such as rods or the like. Previously, such relatively massive bodies of metal nitrides were primarily prepared by employing powder metallurgical procedures or by melting metal pieces in a mold in the presence of a nitrogen atmosphere. However, these metal nitride products suffered several shortcomings or drawbacks which detracted from their usefulness particularly in applications where properties such as high density, i.e., near theoretical density, high purity, and stoichiometric compositions are desired. For example, in practicing powder metallurgical procedures the preparation of the nitride powders and then subsequently pressing and sintering the powders into the desired product configuration are not only time-consuming operations but the resulting product reaches a density of only about 80–95 percent of theoretical density. On the other hand, the preparation of relatively massive metal nitride products by arc melting chips of the selected metal in a mold in a nitrogen atmosphere is substantially more rapid than practicing powder metallurgical procedures, but this technique also has some drawbacks in that considerable cracking and porosity are present. Further, the metal nitride so produced is often less than stoichiometric composition.

Accordingly, it is the primary objective or aim of the present invention to minimize or obviate the aforementioned shortcomings and drawbacks suffered by the previously known techniques for producing metal nitride products. The present invention accomplishes this objective by employing a method for preparing a metal nitride body or structure of an elongated configuration, i.e., rod-shaped, which is of essentially stoichiometric composition and essentially theoretical density. The method comprises the steps of confining an elongated metal body in a nitrogen atmosphere, heating a portion of the body to a temperature sufficient to liquefy said portion of the body through the entire cross section of the body defining said portion for forming a molten zone, and continuously displacing the molten zone along said body a length thereof greater than that provided by said portion.

Other and further objects of the invention will be obvious upon an understanding of the illustrative method about to be described, or will be indicated in the appended claims, and various advantages not referred to herein will occur to one skilled in the art upon employment of the invention in practice. While the description below is primarily directed to the formation of relatively massive bodies of actinide nitrides and actinide alloy nitrides, it is to be understood that the subject method may be readily employed for producing massive bodies of other metal nitrides such as aluminum nitride, as mentioned above.

Generally, the present invention relates to the formation of elongated actinide nitride structures in the form of rods or the like. It has been found that the actinide structures, each of which possesses a density near theoretical density, i.e., at least about 98 percent of the theoretical density, a purity of greater than 99 percent, and an essentially stoichometric composition, can be prepared by employing a moving melting-zone method comprising the steps of confining a rod of the selected actinide in a nitrogen atmosphere, heating a relatively short length of the rod to a temperature greater than the melting point of the actinide to melt a narrow band of the metal (about $\frac{1}{16}$ to $\frac{1}{4}$ inch wide) through the entire cross section of the rod and thereby forming a molten zone in the otherwise solid rod, and then moving the molten zone along a selected length of the rod. As the molten zone is progressively moved, the nitrogen reacts with the molten metal to form the nitride.

In the method of the present invention, relative movement between the heating mechanism and the actinide metal being nitrided is provided after the heating mechanism, preferably an induction coil, is actuated for a duration sufficient to render molten a narrow band of the actinide metal. With the metal in the molten state, either the heating mechanism or the metal rod may be moved to provide for the continuous movement or displacement of the molten zone along a selected length of the actinide metal rod. Induction heating is preferred since the attendant eddy currents produce some stirring effect so as to facilitate the nitriding reaction between the molten metal and the nitrogen atmosphere. The metal rod is preferably mounted in a vertical orientation within a vertically movable induction coil disposed about, and essentially uniformly spaced from the metal rod. With the formation of only a relatively narrow band of molten metal, surface tension is adequate to maintain the integrity of the rod thereby obviating a possible source of contaminants since no mold or other containment vessel is necessary for housing the metal rod during the nitriding operation.

The nitrogen atmosphere is of a high purity of 99.999 percent or greater and at a pressure in the range of about 2 to 10 p.s.i.g.

Actinide metals which may be readily nitrided by the present method include uranium, thorium, thorium-uranium alloys, plutonium, and uranium-plutonium alloys. Also, actinide alloys formed with actinides and other metals such as hafnium, zirconium, titanium, yttrium, tantalum, niobium, vanadium, and the like may be nitrided by the described method. The temperatures used to heat the actinide rods for forming the narrow molten zone are preferably those which will achieve melting in a very rapid manner. For example, satisfactory formation of the molten zone may be achieved by using a temperature of about 2700° C. for uranium, about 2300° C. for thorium, about 2400° C. for uranium-thorium alloys, about 2000° C. for plutonium, and about 2200° C. for uranium-plutonium alloys. In any event, the temperature employed for forming the molten zone is preferably considerably in excess of the melting temperature of the metal since slower heating at lower temperatures, e.g., just above the melting temperature of the actinide, may cause the formation of an excessively wide molten zone so as to prevent surface tension from maintaining the rod-like configuration as the molten zone is moving along the length of the rod. The rate of movement of the heating coil along the rod or, if desired, the rod through the heating coil, is at a rate which will provide complete liquefaction of the metal within the molten zone. Normally, a rate of movement of about one inch per hour is satisfactory. Further, to insure the formation of nitrides of essentially stoichiometric composition, several passes of the molten zone along the selected length of the rod may be necessary. Normally, about 2 to 5 passes are sufficient to convert the metal to the metal nitride of stoichiometric composition. The length of the metal rods is limited only by the size of the containment structure while the cross section or diameter of the rods may be in a range of about 1/16 to 1/2 of an inch. Some growth may occur during the nitriding operation but this growth is minimal since the product is of essentially theoretical density.

In order to provide a better understanding of the present invention examples relating to the conversion of actinide metals and alloys thereof to nitrides are set forth below.

EXAMPLE I

A bar of uranium metal, 8 inches long by 0.156 inch in diameter, was mounted vertically from an upper support within a movable induction coil. The surrounding atmosphere was provided by evacuating and back-filling with nitrogen (99.999 percent pure) to a pressure of 5 p.s.i.g. The heating coil was energized sufficiently to produce a temperature of about 2700° C. within a narrow band (about 1/8 of an inch wide) in the uranium rod, and the coil was moved axially along the rod at a rate of approximately 1.0 inch per hour. After four passes along an inch region of the rod (total elapsed time 4.25 hours), samples were taken from several points in this inch of the product rod and all samples revealed that the product was 98 percent UN or essentially stoichiometric composition, and had a density of 14.1 gms./cc. (98.5 percent of theoretical density). The nitrided section of the rod had increased in diameter to about 0.25 inch.

EXAMPLE II

The method recited in Example I was repeated using a thorium metal rod 8 inches long and 0.25 inch in diameter. Four inches were converted to the nitride. The product rod was analyzed and found to be essentially pure (99.5 percent) ThN and to have a density of 11.7 gms./cc. (11.88 gms./cc. theoretical density).

EXAMPLE III

The method recited in Example I was used for producing (Th,U)N. A metallic rod of 2.0 percent U–98 percent Th, having a diameter of 0.25 inch was subjected to the traveling zone melting. The product rod, about 4 inches in length, analyzed 99.5 percent (Th,U)N with a density of 11.8 gms./cc., 11.95 gms./cc. theoretical density).

It will be seen that the present invention provides an advancement in the art for preparing metal nitrides in the form of relatively massive structures or bodies such as rod-like configurations without suffering the shortcomings previously incurred during nitriding operations. Also, the described method provides for the preparation of metal nitride structures at a rate significantly faster than that provided by powder metallurgical operations. For example, by employing the method of the present invention a uranium nitride bar about 4 inches long by 0.25 inch in diameter may be prepared in approximately 5 hours while preparing a similarly sized bar by using powder metallurgical techniques would require about 100 hours.

What is claimed is:

1. A method for preparing an elongated metal nitride structure of essentially stoichiometric composition and essentially theoretical density, comprising the steps of confining in a nitrogen atmosphere of about 99.999 percent purity at a pressure in the range of 2 to 10 p.s.i.g. an elongated metal body selected from the group consisting of uranium, thorium, plutonium and alloys thereof, heating a portion of the body to a temperature adequate to liquefy said portion through the entire cross section of the body defining said portion for forming a molten zone, and continuously displacing said molten zone along said body a length thereof greater than that provided by said portion.

2. The method for preparing an elongated metal structure as claimed in claim 1, wherein the elongated structure is in the configuration of a rod having a cross section in the range of 1/16 to 1/2 inch.

References Cited

UNITED STATES PATENTS

| | | | |
|---|---|---|---|
| 3,326,820 | 6/1967 | Cuomo et al. | 252—301.1 R X |
| 3,117,859 | 1/1964 | Chandrasekhar | 75—65 Z M X |
| 3,142,533 | 7/1964 | Accary et al. | 423—254 X |
| 3,060,123 | 10/1962 | Theuerer | 75—65 Z M |
| 3,178,259 | 4/1965 | Foster et al. | 423—254 X |
| 3,372,212 | 3/1968 | Gayet et al. | 264—0.5 |

LELAND A. SEBASTIAN, Primary Examiner

R. L. TATE, Assistant Examiner

U.S. Cl. X.R.

75—65 ZM; 252—301.1 R; 423—251, 252, 254, 409